United States Patent
Yu

(10) Patent No.: US 11,501,334 B2
(45) Date of Patent: Nov. 15, 2022

(54) METHODS AND APPARATUSES FOR SELECTING ADVERTISEMENTS USING SEMANTIC MATCHING

(71) Applicant: Walmart Apollo, LLC, Bentonville, AR (US)

(72) Inventor: Shengke Yu, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/738,778

(22) Filed: Jan. 9, 2020

(65) Prior Publication Data
US 2021/0217053 A1 Jul. 15, 2021

(51) Int. Cl.
*G06Q 30/02* (2012.01)
*G06N 20/00* (2019.01)

(52) U.S. Cl.
CPC ......... *G06Q 30/0254* (2013.01); *G06N 20/00* (2019.01)

(58) Field of Classification Search
CPC ....... G06Q 30/0207–30/0277; G06Q 30/0254; G06N 20/00
USPC ....................................... 705/14, 319, 14.52
See application file for complete search history.

(56) References Cited

U.S. PATENT DOCUMENTS

| | | | |
|---|---|---|---|
| 8,402,114 B2 | 3/2013 | Abbott et al. | |
| 8,572,011 B1 | 10/2013 | Sculley, II | |
| 8,688,521 B2 | 4/2014 | Broder et al. | |
| 8,874,698 B2 | 10/2014 | Abbott et al. | |
| 9,135,639 B2 | 9/2015 | Abbott et al. | |
| 9,691,035 B1 * | 6/2017 | Sandler | G06Q 30/0241 |
| 9,691,084 B1 * | 6/2017 | Gong | G06Q 30/0269 |
| 10,115,146 B1 * | 10/2018 | Anderson | G06Q 30/0631 |
| 10,699,210 B2 * | 6/2020 | Bowers | G06Q 50/01 |
| 10,706,453 B1 * | 7/2020 | Morin | G06N 20/20 |
| 10,909,567 B1 * | 2/2021 | Patel | G06N 20/00 |
| 11,176,592 B2 * | 11/2021 | Xie | G06N 20/20 |
| 2009/0112840 A1 * | 4/2009 | Murdock | G06Q 30/02 707/999.005 |
| 2011/0066497 A1 * | 3/2011 | Gopinath | G06Q 30/02 705/14.53 |

(Continued)

OTHER PUBLICATIONS

Deep Style Match for Complementary Recommendation (Year: 2017).*

(Continued)

*Primary Examiner* — Gautam Ubale
(74) *Attorney, Agent, or Firm* — Morgan, Lewis & Bockius LLP; Manita Rawat

(57) ABSTRACT

A system for selecting one or more advertisement items to be presented to a user may include a computing device configured to obtain anchor item data including anchor item title data and anchor item metadata identifying characteristics of an anchor item. The computing device can also obtain advertisement item data including advertisement item title data and advertisement item metadata identifying characteristics of a plurality of advertisement items. The computing device can also determine a match score for each advertisement item of the plurality of advertisement items based on the anchor item data and the advertisement item data, wherein the match score identifies a relevance of the advertisement item to the anchor item. The computing device can then select one or more advertisement items based on the match score of each advertisement item.

17 Claims, 7 Drawing Sheets

(56) References Cited

U.S. PATENT DOCUMENTS

| | | | | |
|---|---|---|---|---|
| 2011/0314039 A1* | 12/2011 | Zheleva | ............... | G06F 16/437 703/2 |
| 2012/0030159 A1* | 2/2012 | Pilaszy | ................. | G06Q 30/00 706/46 |
| 2012/0158552 A1* | 6/2012 | Smith | ............... | G06Q 30/0629 705/27.2 |
| 2012/0316938 A1* | 12/2012 | Moshfeghi | ............. | G06Q 30/02 705/14.16 |
| 2013/0132365 A1* | 5/2013 | Chang | ................ | G06F 16/3344 707/794 |
| 2013/0198030 A1* | 8/2013 | Linden | ............... | G06Q 30/0256 705/26.7 |
| 2013/0204825 A1* | 8/2013 | Su | ........................... | G06N 5/02 706/46 |
| 2013/0216098 A1* | 8/2013 | Hasegawa | ............... | G06T 7/579 901/1 |
| 2013/0218674 A1* | 8/2013 | Willis | ................ | G06Q 30/0251 705/14.49 |
| 2014/0304032 A1* | 10/2014 | Mitchell | ............ | G06Q 30/0201 705/7.29 |
| 2014/0358668 A1* | 12/2014 | Fredinburg | ............ | G06Q 30/02 705/14.66 |
| 2016/0189257 A1* | 6/2016 | Dicker | ................ | G06Q 30/0253 705/26.7 |
| 2017/0024663 A1* | 1/2017 | Liu | ........................ | G06N 20/00 |
| 2017/0140429 A1 | 5/2017 | Cheng et al. | | |
| 2018/0075512 A1* | 3/2018 | Bui | ..................... | G06Q 30/0631 |
| 2018/0365220 A1* | 12/2018 | Chakraborty | ........ | G06N 3/0454 |
| 2020/0089808 A1* | 3/2020 | Liu | .......................... | G06N 3/08 |
| 2020/0104898 A1* | 4/2020 | Cui | .................... | G06Q 30/0631 |
| 2020/0226168 A1* | 7/2020 | Chen | ..................... | G06F 16/972 |
| 2021/0012391 A1* | 1/2021 | Unnikrishnan | ........ | G06N 20/00 |
| 2021/0012406 A1* | 1/2021 | Wadhwa | ............ | G06Q 30/0282 |
| 2021/0064676 A1* | 3/2021 | Rawal | ................ | G06F 16/9577 |
| 2021/0214274 A1* | 7/2021 | Friedman | ................ | G02F 1/155 |
| 2021/0217053 A1* | 7/2021 | Yu | ...................... | G06Q 30/0254 |
| 2022/0253878 A1* | 8/2022 | Rao | ...................... | G06Q 40/025 |

OTHER PUBLICATIONS

Personalized Attraction Enhanced Sponsored Search with Multi-task Learning (Year: 2019).*

The best preferred product location recommendation according to user context and the preferences (Year: 2017).*

AiAds: Automated and Intelligent Advertising System for Sponsored Search (Year: 2019).*

Large-Scale Personalized Delivery for Guaranteed Display Advertising with Real-Time Pacing (Year: 2019).*

Huang et al., "Learning Deep Structured Semanitc Models for Web Search Using Clickthrough Data," ACM Conference of Information and Knowledge Management (CIKM), Oct. 27- Nov. 1, 2013, San Francisco, CA, 4 pages.

* cited by examiner

METHODS AND APPARATUSES FOR SELECTING ADVERTISEMENTS USING SEMANTIC MATCHING

TECHNICAL FIELD

The disclosure relates to methods and apparatuses for the selection of advertisements using semantic matching. More specifically, the disclosure relates to the selection of advertisements to be displayed to a user in an e-commerce environment.

BACKGROUND

At least some websites and applications, such as retailer websites or other e-commerce environments, display advertisements to users while the user is viewing various items or information on the website. For example, the website may display recommended items or sponsored items on a webpage that may be of interest to the user. It can be desirable to display advertisements for recommended items or other sponsored items that are of more interest or more relevant to the user to cause the user to click on, view and purchase such additional recommended items or sponsored items during the user's browsing session on the website. The display of such advertisements, therefore, can increase sales, drive click-through rates and improve customer satisfaction. Therefore, there is a need in the marketplace to increase the relevance of displayed advertisements to users and/or to increase click-through rates, increase views of advertised items and increase sales.

SUMMARY

The embodiments described herein are directed to automatically selecting advertisement items that may be of interest to a user of a website or other e-commerce application based on both title data and metadata for an anchor item that may be viewed by the user. The examples and embodiments described herein may allow a user or customer to be presented with such selected advertisement items. As a result, more relevant advertisement items can be presented to the user than may otherwise be selected using conventional methodologies. The more relevant advertisement items can cause increased views of such advertisement items, increased clickthrough rates, increased sales and increased customer satisfaction.

In accordance with various embodiments, exemplary systems may be implemented in any suitable hardware or hardware and software, such as in any suitable computing device. For example, in some embodiments, a computing device is configured to obtain anchor item data including anchor item title data and anchor item metadata identifying characteristics of an anchor item. The computing device can also obtain advertisement item data including advertisement item title data and advertisement item metadata identifying characteristics of a plurality of advertisement items. The computing device can also determine a match score for each advertisement item of the plurality of advertisement items based on the anchor item data and the advertisement item data, wherein the match score identifies a relevance of the advertisement item to the anchor item. The computing device can then select one or more advertisement items based on the match score of each advertisement item.

In one aspect, the anchor item title data can correspond to a product name of the anchor item displayed on a website or application and the anchor item metadata can correspond to categorical information into which the anchor item is organized.

In some embodiments, a method is provided that includes obtaining anchor item data comprising anchor item title data and anchor item metadata identifying characteristics of an anchor item. The method may also include obtaining advertisement item data comprising advertisement item title data and advertisement item metadata identifying characteristics of a plurality of advertisement items. The method may also include determining a match score for each advertisement item of the plurality of advertisement items based on the anchor item data and the advertisement item data, wherein the match score identifies a relevance of the advertisement item to the anchor item and selecting one or more advertisement items based on the match score of each advertisement item.

In yet other embodiments, a non-transitory computer readable medium has instructions stored thereon, where the instructions, when executed by at least one processor, cause a computing device to perform operations that include obtaining anchor item data comprising anchor item title data and anchor item metadata identifying characteristics of an anchor item. The operations may also include obtaining advertisement item data comprising advertisement item title data and advertisement item metadata identifying characteristics of a plurality of advertisement items. The operations may also include determining a match score for each advertisement item of the plurality of advertisement items based on the anchor item data and the advertisement item data, wherein the match score identifies a relevance of the advertisement item to the anchor item and selecting one or more advertisement items based on the match score of each advertisement item.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
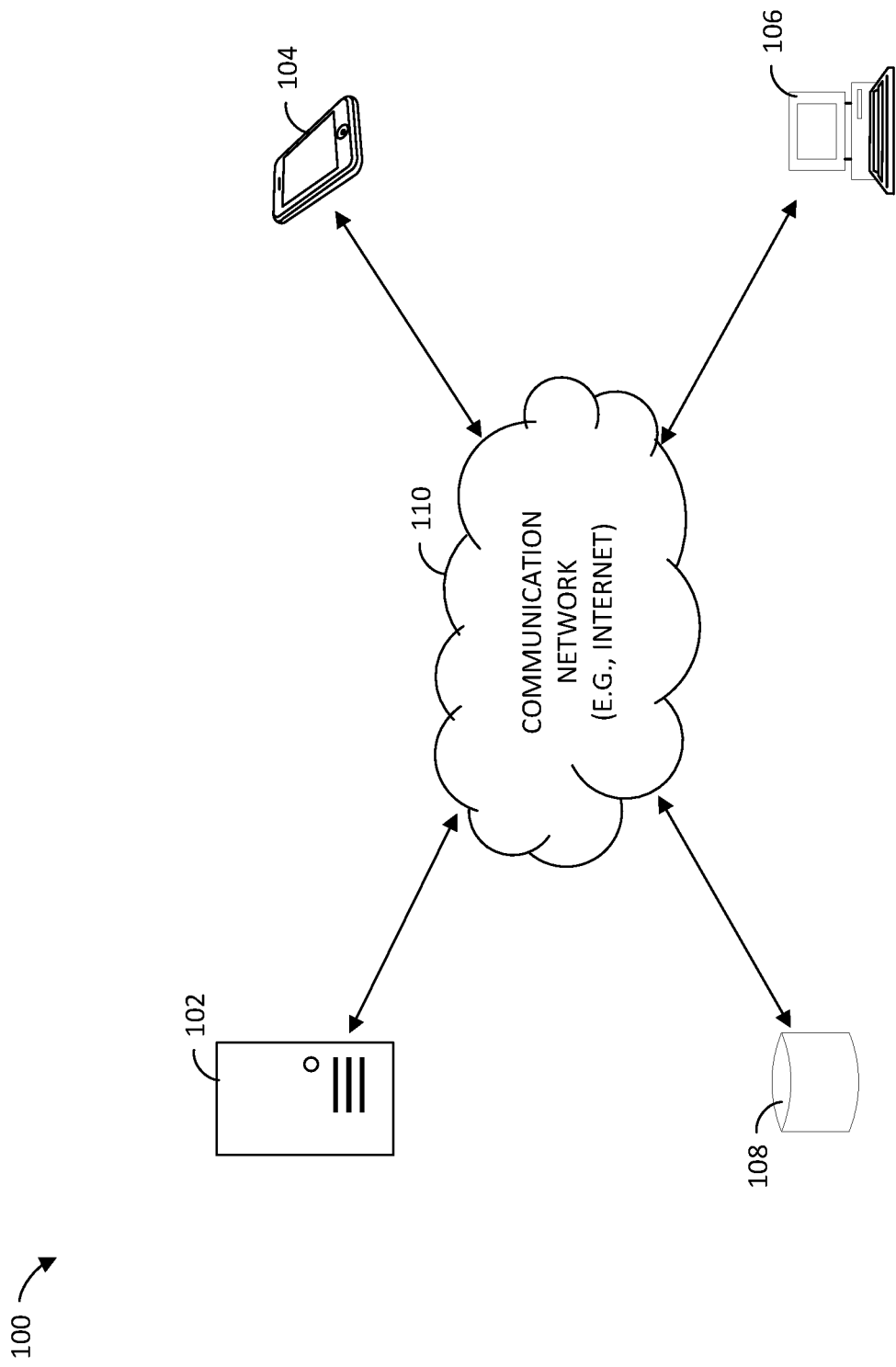
FIG. 1 is an illustration of a network system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The examples and teachings of the present disclosure relate to apparatuses and methods for selecting advertisements using semantic matching. Many websites, applications or other tools on personal computing devices can operate to present an advertisement, link or recommended items to a user. Such advertisements, for example, can be selected based on a relevance (e.g., similarity or relatedness) to an item or to subject matter that is currently being displayed to a user. In a retail environment, for example, a user may be viewing an item on a retailer's website that the user is interested in purchasing. It can be desirable to display related items to the user so that such related items or advertisements can be selected and/or viewed by the user. As can be appreciated, it can be desirable to improve the likelihood that the user will be interested in the related items or advertisements that are displayed to the user. As the likelihood that the user will be interested increases, the likelihood that the user will purchase an item on the retailer's website (or application) can increase as well.

Conventional apparatuses and methods for selecting advertisements can use systems and methods to select advertisements to be displayed to a user. Such existing systems and methods, however, often use keyword matching or other methodology that suffers from drawbacks that filter out many good candidate advertisement because the words that are used during the matching process do not meet the requirements of such keyword matching systems. One example conventional methodology is term frequency-inverse document frequency (TF-IDF) methodology. In TF-IDF, a numerical statistic can be calculated to rank an advertisement's relevance to a particular item that a user may be viewing. TF-IDF methodology and other conventional methodologies, however, can filter out good candidate advertisements because the words of the user viewed item and the words in candidate advertisements may not match under the narrow requirements of the keyword matching methodology. For example, existing TF-IDF methodology may only use a product name and/or words in such a product name or description during the matching process. There exists a need, therefore, for the improved semantic matching apparatuses of the present disclosure that use other and/or additional information to rank and select advertisements.

The apparatuses and methods of the present disclosure can select advertisements for related and/or similar products but may have different titles and/or different keywords than an anchor item (i.e., a user-viewed item).

For purposes of the present disclosure the term "anchor item" means an item that is being viewed by a user or is somehow otherwise indicated as being of interest to the user. In some examples, the user may search for the anchor item, click on a link to the anchor item or have previously purchased the anchor item. The anchor item, for example, can be a product that the user is interested in purchasing. In many instances, the anchor item is being displayed in a browser or on an application on the user's personal computing device. The apparatuses and methods of the present disclosure can operate to select and/or rank advertisements that are relevant (e.g., related and/or similar) to the anchor item. In some instances, the selected advertisements can appear (or be otherwise presented) as a "sponsored products" listing or a "recommended products" listing on the anchor item page by the browser and/or application.

For purposes of the present disclosure, the terms "advertisement" and/or "advertisement item" are used to mean a listing that exists within a group of possible listings that can be offered to a user. For example, an advertisement item on a retailer's website or application can be listings for products or services that are available for viewing and/or purchase by the user other than, or in addition to, the anchor item.

Turning to the drawings, FIG. 1 illustrates a block diagram of a network system 100 that includes an advertisement selection computing device 102 (e.g., a server, such as an application server), a mobile user computing device 104 (e.g., a smart phone), a desktop user computing device 106, and database 108 operatively coupled over communication network 110. The advertisement selection computing device 102 and multiple user computing devices 104, 106 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 110.

In some examples, the advertisement selection computing device 102 can be a computer, a workstation, a laptop, a server such as a cloud-based server, or any other suitable device. In some examples, each of multiple user computing devices 104, 106 can be a cellular phone, a smart phone, a tablet, a personal assistant device, a voice assistant device, a digital assistant, a laptop, a computer, or any other suitable device.

Advertisement selection computing device 102 is operable to communicate with database 108 over communication network 110. For example, advertisement selection computing device 102 can store data to, and read data from, database 108. Database 108 can be a remote storage device, such as a cloud-based server, a memory device on another application server, a networked computer, or any other suitable remote storage. Although shown remote to advertisement selection computing device 102, in some examples, database 108 can be a local storage device, such as a hard drive, a non-volatile memory, or a USB stick.

Communication network 110 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 110 can provide access to, for example, the Internet.

Figure 2:
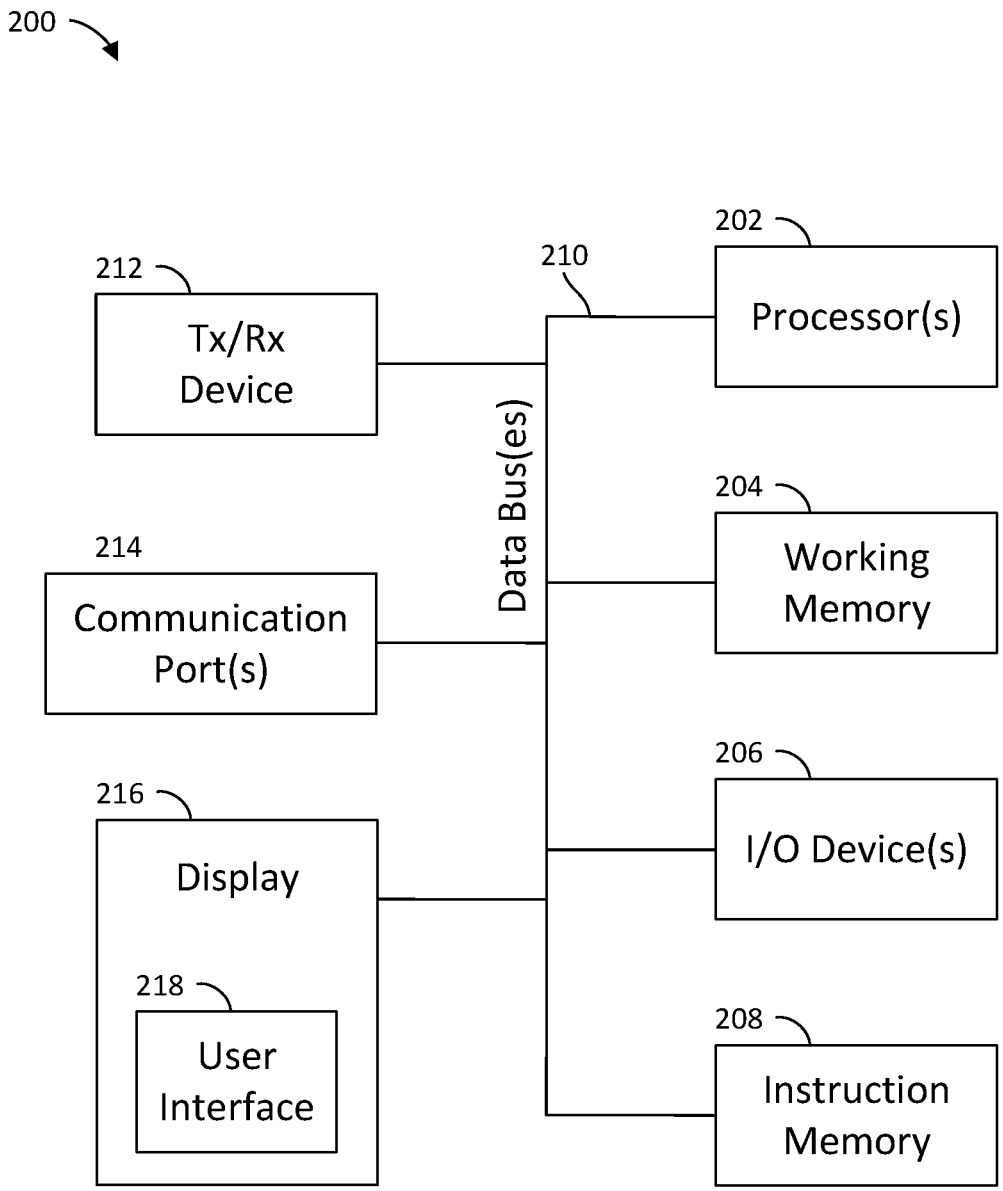
FIG. 2 is a block diagram of an advertisement selection computing device of the network system of FIG. 1 in accordance with some embodiments.

FIG. 2 illustrates an example computing device 200. The advertisement selection computing device 102 and/or the user computing devices 104, 106 may include the features shown in FIG. 2. For the sake of brevity, FIG. 2 is described relative to the advertisement selection computing device 102. It should be appreciated, however, that the elements described can be included, as applicable, in the user computing devices 104, 106.

As shown, the advertisement selection computing device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of advertisement selection computing device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allows for the transfer (e.g., uploading or downloading) of data, such as anchor item data, advertisement item data and/or other data.

Display 216 can display a user interface 218. User interface 218 can enable user interaction with the advertisement selection computing device 102. For example, user interface 218 can be a user interface that allows an operator to interact, communicate, control and/or modify different messages or features that may be presented or otherwise displayed to a user by a network-enabled tool. The user interface 218 can, for example, display the selected advertisements that are selected by the advertisement selection computing device 102 to a user. In some examples, a user can interact with user interface 218 by engaging input-output devices 206. In some examples, display 216 can be a touchscreen, where user interface 218 is displayed on the touchscreen.

Transceiver 212 allows for communication with a network, such as the communication network 110 of FIG. 1. For example, if communication network 110 of FIG. 1 is a cellular network, transceiver 212 is configured to allow communications with the cellular network. In some examples, transceiver 212 is selected based on the type of communication network 110 advertisement selection computing device 102 will be operating in. Processor(s) 202 is operable to receive data from, or send data to, a network, such as communication network 110 of FIG. 1, via transceiver 212.

Figure 3:
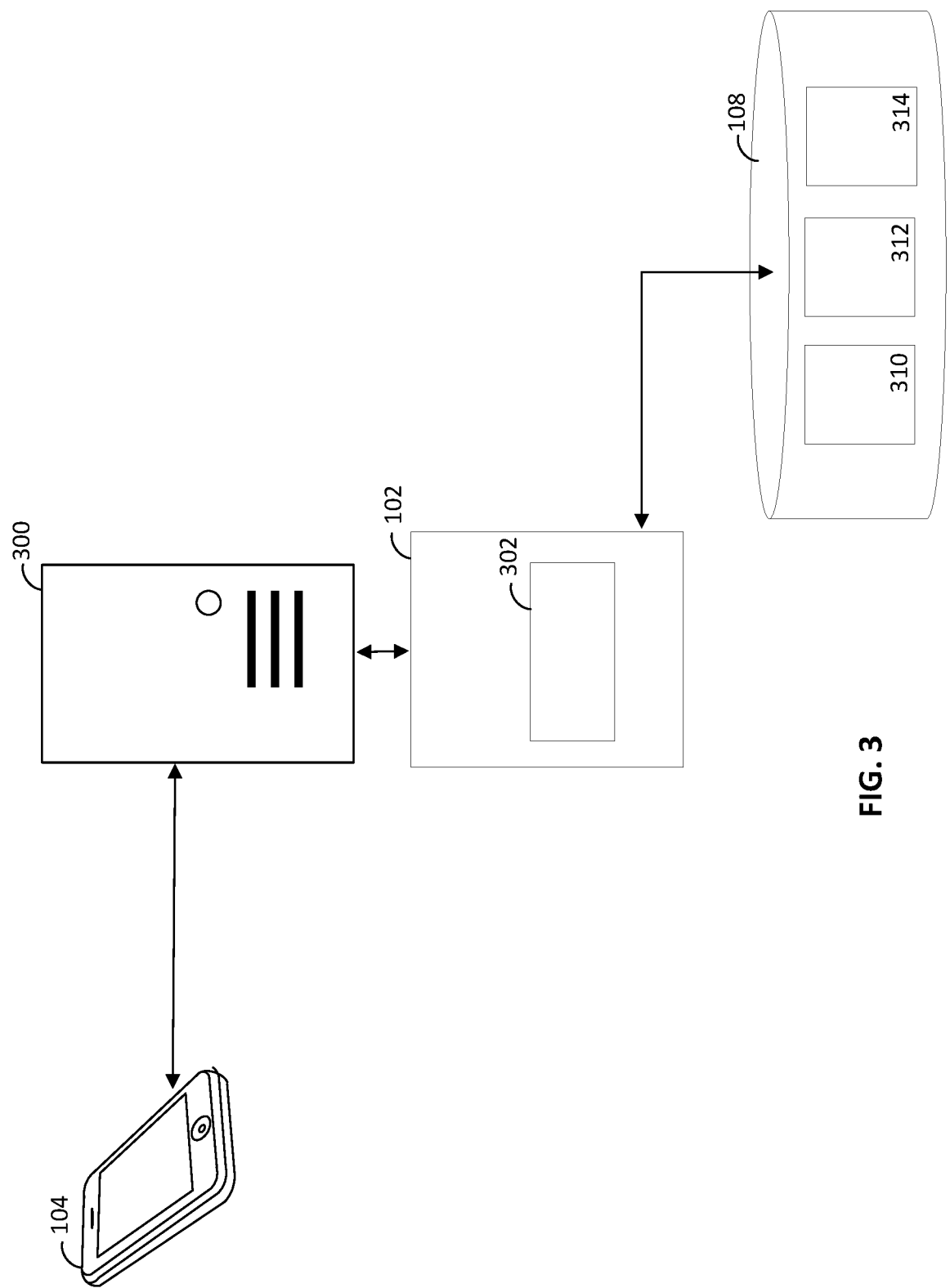
FIG. 3 is a block diagram illustrating examples of various portions of the network system of FIG. 1 including the advertisement selection computing device in accordance with some embodiments.

Referring now to FIG. 3, an example network system is shown. In this illustration, the network 110 is not shown. However, it should be appreciated that the communication between the mobile personal computing device 104, a network server 300, the advertisement selection computing device 102 and the database 108 can be achieved by use of the network 110 as previously described. In the example shown, the mobile personal computing device 104 can be in communication with the network server 300. The network server 300 can operate to deliver item content to the mobile personal computing device 104. In some examples, the network server 300 can host product or item content that can be delivered to the mobile personal computing device 104. In this manner, the network server 300 can allow a user to browse, shop and/or otherwise view item content on a retailer's website and/or mobile application.

The advertisement selection computing device 102 can be coupled to the network server 300. The advertisement selection computing device 102 can include an advertisement ranking model 302. The advertisement ranking model 302 can be any suitable tool used to determine the relevance, relatedness and/or similarity between an anchor item and an advertisement item. The advertisement ranking model 302 can, for example, be created using artificial intelligence or machine learning in which the model is trained using structured training data. The trained advertisement ranking model 302 can thereafter be applied to determine the relatedness and/or similarity between an anchor item and an advertisement item.

The term model as used in the present disclosure includes predictive models created using deep-learning. Deep-learning is a type of machine learning that may involve training a model in a supervised or unsupervised setting. Deep-learning models may be trained to learn relationships between various groups of data. Deep-learning models may be based on a set of algorithms that are designed to model abstractions in data by using a number of processing layers. The processing layers may be made up of non-linear transformations. Deep-learning models may include, for example, neural networks, multilayer perceptron neural networks with many hidden layers, convolutional neural networks and recurrent neural networks. Such neural networks may be made of up of levels of trainable filters, transformations, projections, hashing, and pooling. The deep learning models may be used in large-scale relationship-recognition tasks. The models can be created by using various open-source and proprietary machine learning tools known to those of ordinary skill in the art.

As further shown in FIG. 3, the advertisement selection computing device 102 can be coupled to the database 108. The database 108 can, in some examples, include anchor item data 310, co-viewed item data 312 and advertisement item data 314. Each of these data sets can include further categories of data within each data set. For example, each of the data sets can include title data and metadata (e.g., category data). Title data can include the words and information related thereto that make up the title (i.e., product name and/or description) of the item. In the context of a retailer, the title data can include, for example, a brand, and a name of a product being offered for sale to the user. One instance of title data can include "brand X, leather lace-up hi-top sneaker" for example.

Metadata can be data that further describes one or more attributes of an item that the retailer uses to organize the item within the corpus of items offered by the retailer. One example of metadata is category data. One instance, using the example above, of category data can include organizational attributes of the item. For the "brand X, leather lace-up hi-top sneaker," for example, the retailer may organize this item within its corpus of items as "Clothing/Shoes/Men's Shoes/Men's Sneakers & Athletic/Men's High Top Sneakers." The category data can include data related to these categories of "clothing" "shoes," "men's shoes," "men's sneakers & athletic," and "men's high top sneakers." The leaf category data can include data related to the bottom-level category of "men's high top sneakers." As will be further explained, the advertisement ranking model 302 can use the title data and the leaf category data (or more generally, any category data) to better select related and/or similar advertisement items than conventional methodologies.

Figure 4:
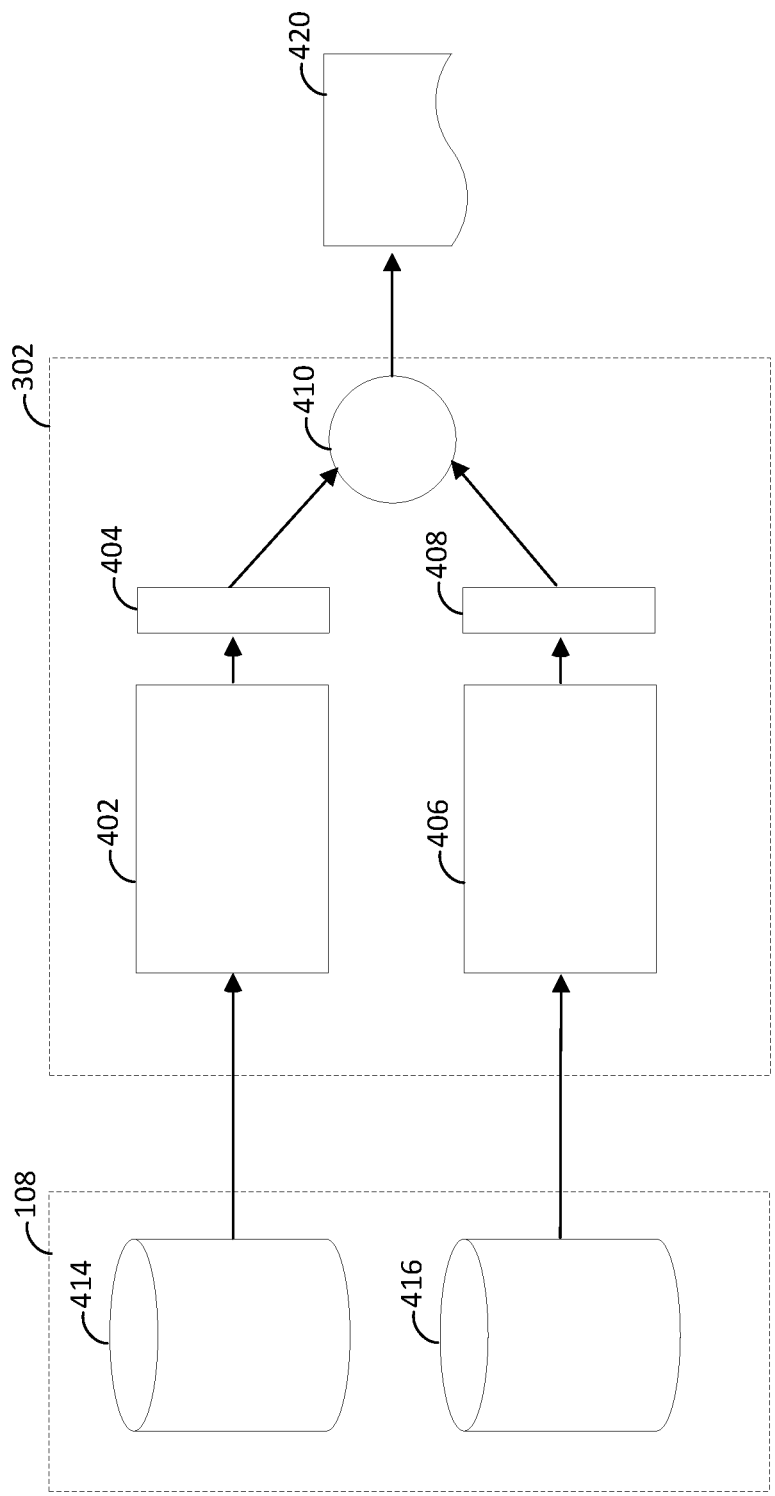
FIG. 4 is a block diagram illustrating examples of various portions of a advertisement ranking model of the advertisement selection computing device of FIG. 3 in accordance with some embodiments.

Referring now to FIG. 4, a block diagram illustrating aspects of the advertisement ranking model 302 is presented. As shown, the advertisement ranking model 302 can be structured as a Siamese style neural network with two deep neural networks 402 and 406. A first data set 414 and a second data set 416 can be input into the first deep neural network 402 and the second deep neural network 406, respectively. During use of the advertisement ranking model 302, the first data set 414 can correspond to anchor item data 310 and the second data set 416 can correspond to advertisement item data 314. Each of the deep neural networks 402 and 406 can process the respective data sets 414 and 416 to extract high level semantic vector representations 404 and 408, respectively. The semantic vector representations 404 and 408 can then be compared to each other using any suitable comparison methodology by the comparison engine 410. In one example, the comparison engine 410 can compare the semantic vector representations 404 and 408 using vector cosine similarity. Based on the comparison determined by the comparison engine 410, the advertisement ranking model 302 can rank and/or select advertisement items from the second data set 416 (e.g., the advertisement item data 314) to create a match score (and/or ranking) 420 of the advertisement items. This information can, in turn, be used to decide which advertisement items to present to a user.

Figure 5:
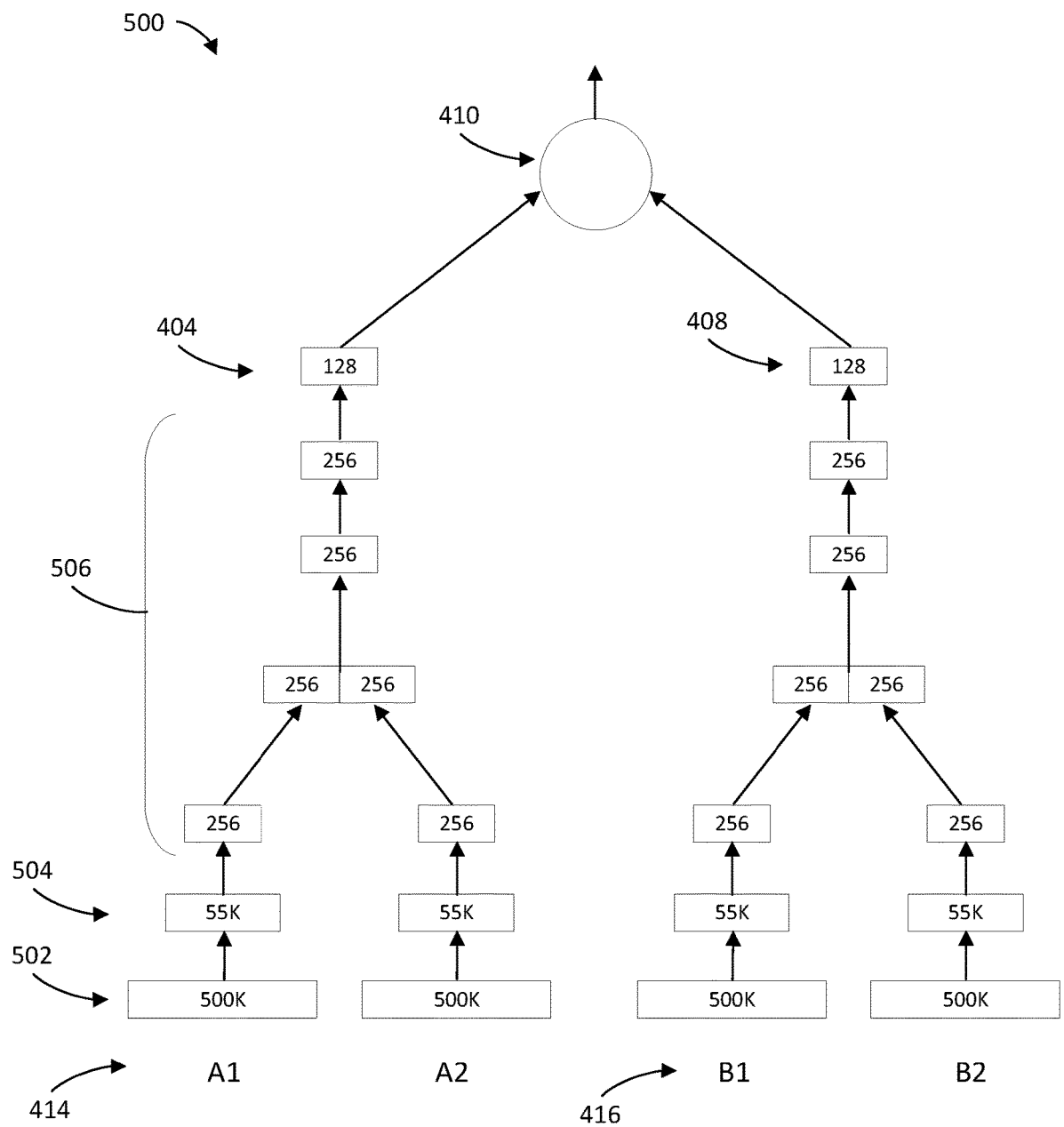
FIG. 5 is an illustration of architecture of an example advertisement ranking model of FIG. 4 in accordance with some embodiments.

FIG. 5 illustrates an example architecture 500 for the advertisement ranking model 302. As described above, the architecture 500 can be structured as a Siamese style neural network. The two sub-neural networks, however, are different in that one neural network extracts the semantic vector representation 404 for the anchor item while the other neural network extracts the semantic vector representation 408 for the advertisement item. The first data set 414 that is input into one of the sub-neural networks can be the anchor item data 310. The second data set 416 that is input into the other sub-neural network can be the advertisement item data 314 during use of the advertisement ranking model 302. When the advertisement ranking model 302 is being trained, however, the second data set 416 can be a different set of item data such as co-viewed item data 312.

The advertisement ranking model 302, prior to use in selecting advertisement items, can be trained using anchor item data 310 as the first data set 414 and co-viewed item data 312 as the second data set 416. Co-viewed item data 312 is, for example, a set of data that corresponds to items that a user viewed during a common browsing session on the retailer's website or e-commerce application. The co-viewed item data 312 can be determined from historical collected data from users' behavior on the retailer's website or application. In other examples, the second data set 416 can correspond to clickthrough item data. Clickthrough item data can correspond to items that a user actually clicked on when viewing an anchor item product listing. Co-viewed item data 312 was used in this example because the availability of clickthrough item data is limited. The quantity of co-viewed item data 312 is much larger than the quantity of available clickthrough item data. Therefore, to alleviate model over-generalization problems caused by training data sparsity issues, the co-viewed item data 312 was used.

During training of the advertisement ranking model 302, the first data set 414 (e.g., the anchor item data 310) can include both anchor item title data A1 and anchor item leaf category data A2. The second data set 416 (e.g., co-viewed item data 312) can include both co-viewed item title data B1 and co-viewed item leaf category data B2. As explained above, the title data A1, B1 can be created from the title or description of the product item. The leaf category data A2, B2 can be created from the taxonomy or categorical organization of the product item in the retailer's (or other organization's) classification of the product item. Thus, the training data used to train the advertisement ranking model 302 can include <anchor item, co-viewed item> pairs with both title data and leaf category data.

With further reference to FIG. 5, the input data 414, 416 can be converted from normalized item titles and normalized item leaf categories into title vectors and leaf category vectors that the neural networks can consume. Such conversion can begin with generating an English vocabulary from the historical co-viewing data. Next, the term vectors 502 (FIG. 5) for item titles and item leaf categories can be generated using the vocabulary previously created. Next, word hashing can be used to generate character-trigram-based item title vectors and item leaf category vectors 504. During such word hashing, the item title or item leaf category can be assumed to a "bag of words" or a "bag of word ngrams." In the example shown, the item title or item leaf category was assumed to be a "bag of words."

The integers shown in each layer of the neural networks (FIG. 5) correspond to the number of units (i.e., vector dimensions). Each 512-dimension vector, in the example shown, is a concatenation of a 256-dimension title vector and the corresponding 256-dimension leaf category vector. Each sub-neural network can include multiple layers of non-linear projections 506 that can extract the semantic vector representations 404 and 408 from the input term vectors 502 previously described. The semantic vector representations 404 and 408 can then be compared by the comparison engine 410 using cosine similarity or other suitable comparison methodology.

After the model is trained using the anchor item data 310 and the co-viewed item data 312, the advertisement ranking model 302 can be used to determine a relevance or similarity between anchor items and advertisement items. During use of the model, the anchor item data 310 can be input to the advertisement ranking model 302 in one of the sub-neural networks of the architecture shown in FIG. 5 in a similar manner as previously described. The anchor item title data can be input as data A1 and the anchor item leaf category data can be input as data A2. In the other sub-neural network, advertisement item data 314 can be input as the second data set 416. The advertisement item title data can be input as data B1 and the advertisement item leaf category data can be input as data B2. The same process of creating the term vectors 502 and the character-trigram-based item title vectors and item leaf category vectors 504 can be performed. The sub-neural networks can perform the multi-layer non-linear projections 506. The advertisement ranking model 302 can extract the semantic vector representation 404 that corresponds to the anchor item data and the semantic vector representation 408 that corresponds to the advertisement item data. The comparison engine 410 can then compare the semantic vector representations 404 and 408 using vector cosine similarity to determine the match score 420. The match score 420 can then be used to select (or rank) the advertisement items that can be presented to the user.

The above example advertisement selection computing device 102 with the advertisement ranking model 302 was trained and tested for a period of 10 days on a retailer website. The advertisement selection computing device 102 demonstrated improvements over conventional advertisement selection system using TF-IDF methodology. The performance of the advertisement selection computing device 102 were measured using effective ClickThrough Rate (eCTR), effective Cost Per Mille (eCPM), Ad Spend and the number of clicks. Improvements were found for each of these measurements as shown below.

| Metric | eCTR | eCPM | Ad Spend | # of Clicks |
|---|---|---|---|---|
| Improvement | 3.9% | 9.1% | 7.0% | 2.1% |

Figure 6:
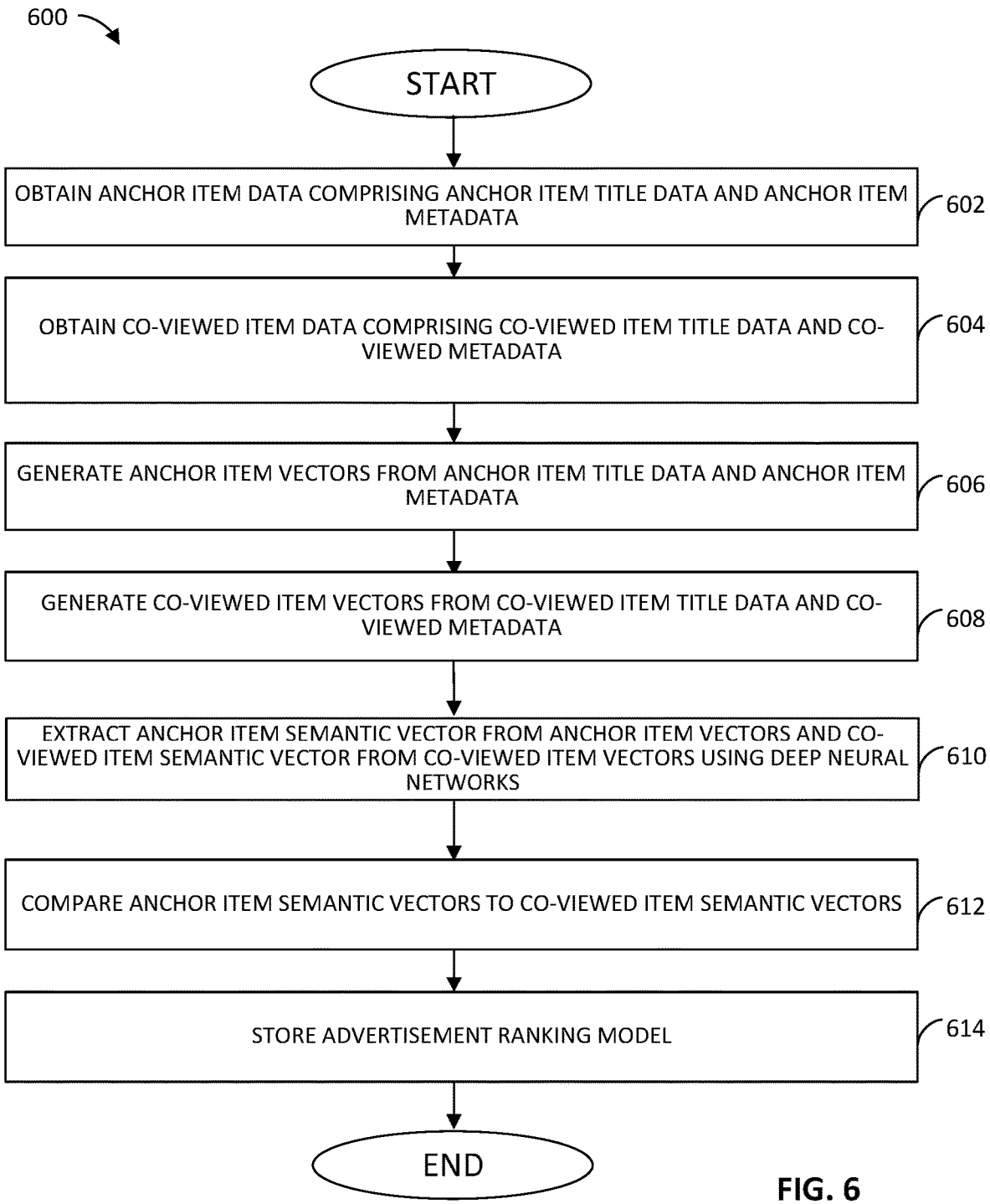
FIG. 6 is a flow chart of an example method that can be carried out to train the advertisement ranking model of FIG. 5 in accordance with some embodiments.

Referring now to FIG. 6, an example method 600 of training an advertisement ranking model is illustrated. The method can be used, for example, to train the advertisement ranking model 302 previously described. At step 602, anchor item data can be obtained. The anchor item data can include anchor item title data and anchor item metadata. The anchor item title data, as previously described, can correspond to the description of the item on a product listing webpage. The anchor item metadata can be data regarding further characterization, organization or classification of the anchor item. In the examples described above, the metadata can be leaf category data. In other examples, the metadata can be other organizational or classification data about the anchor item. Other examples of metadata that can be used include brand information, sales rank information and the like.

At step 604, co-viewed item data can be obtained. The co-viewed item data is data paired with the anchor item data. The co-viewed item data can be extracted from historical data of users activity on a website or application and can demonstrate the items that a user viewed along with the anchor item during a common browsing session on a website or application. The co-viewed item data can include co-viewed item title data and co-viewed item metadata. The title data and the metadata can be similar types of data as that previously described for the anchor item data. In other examples, other training data can be used such as click-through data or synthetic data created according to business needs and/or customer experience.

At step 606, anchor item vectors can be generated from the anchor item title data and the anchor item metadata. Any suitable methodology can be used to generate the anchor item vectors. In some examples, the anchor item vectors can be generated by one or more sub-processes. Such sub-processes can include generating an English vocabulary, generating word vectors, and generating char-trigram-based item vectors from the word vectors. Word hashing can also be used.

At step 608, co-viewed item vectors can be generated from the co-viewed item title data and the co-viewed item metadata. Any suitable methodology can be used and the same or similar methodology as that used to generate the anchor item vectors can be used. In some examples, the co-viewed item vectors can be generated by one or more sub-processes. Such sub-processes can include generating an English vocabulary, generating word vectors, and generating char-trigram-based item vectors from the word vectors. Word hashing can be used. After performing steps 606 and 608, paired anchor item and co-viewed item vectors have been generated.

At step 610, anchor item semantic vectors and co-viewed item semantic vectors are extracted from the anchor item vectors and the co-viewed item vectors using a neural network. The anchor item vectors and the co-viewed item vectors can be input to any suitable deep neural networks. In one example, the neural network is a Siamese style network comprised of two multilayer perceptron (MLP) sub-neural networks with three hidden layers. In other examples, open-source deep learning and deep neural networks known to those of ordinary skill in the art can be used.

At step 612, each anchor item semantic vector is compared to a co-viewed item semantic vector. The comparison can be performed by the comparison engine 410, for example, by determining the cosine similarity. In other examples, other suitable comparison methodologies can be used. At step 614, the advertisement ranking model that was trained using steps 602 through 612 can be stored for later use. The advertisement ranking model is now trained and can be used to rank and/or select advertisement items to be presented to a user.

Figure 7:
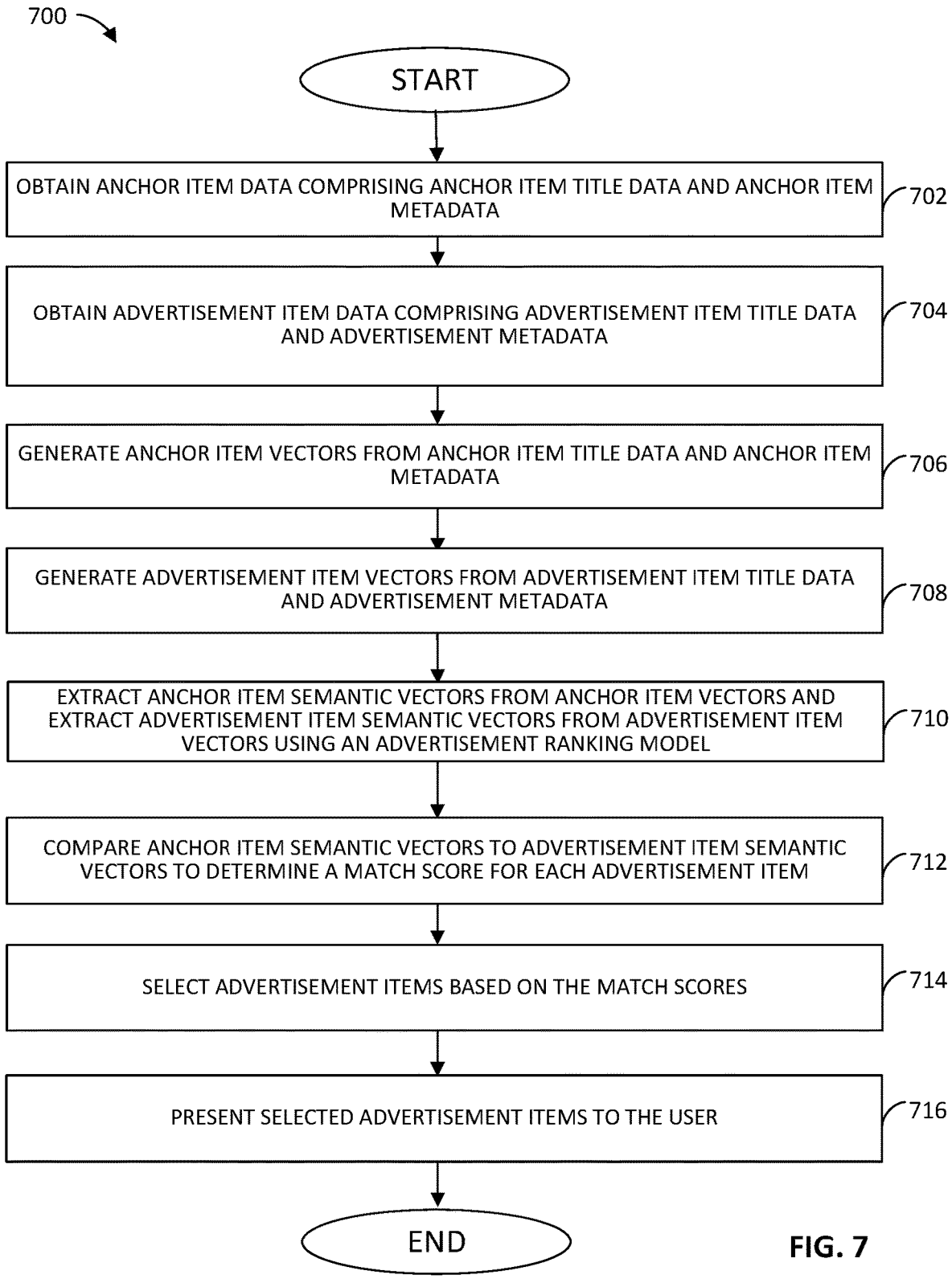
FIG. 7 is a flow chart of an example method that can be carried out to select an advertisement using the advertisement ranking model of FIG. 4 in accordance with some embodiments.

Referring now to FIG. 7, a method 700 of selecting an advertisement using semantic matching is presented. The method 700 can be performed using one or more the elements of network 100 and/or the advertisement selection computing device 102 previously described. At step 702, anchor item data is obtained. The anchor item data may include anchor item title data and anchor item metadata. The anchor item data can be stored, for example, in database 108. The advertisement selection computing device 102 can, in some examples, retrieve the stored anchor item data from the database 108. In other examples, the anchor item data can be stored in other storage devices and/or in other locations.

At step 704, advertisement item data can be obtained. The advertisement item data may include advertisement item title data and advertisement item metadata. The advertisement item title data was previously described and can correspond to the description of the advertisement item on a product listing webpage. The advertisement item metadata can be data regarding further characterization, organization or classification of the advertisement item. In the examples described above, the metadata is the leaf category data. In other examples, the metadata can be other organizational or classification data about the advertisement item. The advertisement item data can be stored, for example, in database 108. The advertisement selection computing device 102 can, in some examples, retrieve the stored advertisement item data from the database 108. In other examples, the advertisement item data can be stored in other storage devices and/or in other locations.

At step 706, anchor item vectors can be generated from the anchor item title data and the anchor item metadata. As previously described one or more sub-processes may be performed to generate the anchor item vectors. Such sub-processes may include normalization, generating an English vocabulary, generating word vectors, and generating char-trigram-based item vectors from the word vectors. Word hashing can also be used.

At step 708, advertisement item vectors can be generated from the advertisement item title data and the advertisement item metadata. This process can be similar to the process used to create the anchor item vectors at step 706. As such, one or more sub-processes may be performed to generate the advertisement item vectors. Such sub-processes may include normalization, generating a char-trigram vocabulary, generating word vectors, and generating char-trigram-based item vectors from the word vectors. Word hashing can also be used.

At step 710, anchor item semantic vectors can be extracted from the anchor item vectors and advertisement item semantic vectors can be extracted from the advertisement item vectors using an advertisement ranking model. The advertisement ranking model can be a trained advertisement ranking model 302 that is trained using the example method 600. The advertisement ranking model can be created using any suitable deep neural networks. In some examples, the neural network is a Siamese style network comprised of two multilayer perceptron (MLP) sub-neural networks with three hidden layers. In other examples, open-source deep learning and deep neural networks known to those of ordinary skill in the art can be used.

At step 712, the anchor item semantic vector can be compared to the advertisement item semantic vector to determine a match score for each advertisement item. The match score can characterize the relevance, relatedness and/or similarity of the advertisement item to the anchor item. The match score can be a numerical score that characterizes the likelihood that a user will be interested in viewing, purchasing, and/or clicking on the advertisement item given the user's interest in the anchor item. In some examples, the match score can be determined using the comparison engine 410 previously described. In such examples, the comparison engine 410 can calculate the cosine similarity between the anchor item semantic vector and an advertisement item semantic vector. The cosine similarity can be the determined match score. In other examples, other suitable comparison methodology can be used.

At step 714, advertisement items can be selected based on the match scores determined at step 712. In some examples, the advertisement items can be ranked based on the match scores. The advertisement items with the highest match scores can be selected from corpus of match scores calculated at step 712. In some examples, a predetermined number of advertisement items is desirable to be selected (e.g., top 20 advertisement items). In other examples, a predetermined threshold is established and only those advertisement items associated with a match score equal to or greater than the predetermined threshold are selected. In other examples, other methodologies can be used to select advertisement items.

At step 716, the selected advertisement items can be presented to the user. For example, the selected advertisement items can be presented to the user on the website or application as "recommended items," "sponsored items," or with other suitable labels.

In some examples, the steps of method 700 or portions of the method 700 can be performed on a periodic basis. In such examples, the advertisement items that are selected for each anchor item can be stored for later use. Thus, when a user views an anchor item on a website or application, the advertisement selection computing device 102, for example, can access the selection of advertisement items for the anchor item and present such advertisement items to the user. The steps of method 700 or portions of the method 700 can performed each time the advertisement ranking model 302 is re-trained or otherwise updated to determined updated selected advertisement items. The steps of method 700 or portions of the method 700 can also, in other examples, be performed on a periodic basis (e.g., daily, weekly, monthly, etc.) in order that newly available advertisement items are included in the selected advertisement items. The advertisement ranking model 302 can also be periodically re-trained to update the model with the latest available information and data regarding users' behaviors.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device communicatively coupled to at least one server, the computing device configured to:
during a first time interval, train an advertisement ranking machine-learning model that extracts semantic vector representations using a first dataset including anchor item data of a plurality of anchor items and a second dataset including co-viewed item data, the co-viewed item data comprising (i) historical data of co-view items that were viewed on an e-commerce platform along with one or more of the plurality of anchor items during a common browsing session, and (ii) for each of the co-view items, a corresponding categorical information into which the item is organized;
during a second time interval, retrain the advertisement ranking machine-learning model using an updated first data set and an updated second dataset;
obtain anchor item data of an anchor item currently displayed on a user interface generated by a service application executing on at least a second computing device, the anchor item data of the anchor item comprising anchor item title data and anchor item metadata identifying characteristics of the anchor item and corresponding to categorical information into which the anchor item is organized;
obtain advertisement item data comprising advertisement item title data and advertisement item metadata identifying characteristics of a plurality of advertisement items;
generate semantic vector representations of the anchor item and each of the plurality of advertisement items by applying the re-trained advertisement ranking machine-learning model to the anchor item data of the anchor item and the advertisement item data of the plurality of advertisement items, the semantic vector representations of the anchor item including one or more anchor item semantic vectors and being generated from the anchor item data and the semantic vector representations of each of the plurality of advertisement items including one or more advertisement item semantic vectors and being generated from the advertisement item data;
determine a match score for each advertisement item of the plurality of advertisement items based at least on the semantic vector representations of the anchor item and each of the plurality of advertisement items the match score identifies a relevance of the advertisement item to the anchor item;
select one or more advertisement items based on the match score of each of the plurality of advertisement items; and
present, via the at least one server and on the user interface generated by the service application executing on at least the second computing device, the one or more selected advertisement items, along with the displayed anchor item.

2. The system of claim 1, wherein the anchor item title data corresponds to a product name of the anchor item displayed on a website or application and the anchor item metadata comprises leaf category data.

3. The system of claim 1, wherein the match score is determined by comparing the anchor item data to the advertisement item data using cosine similarity.

4. The system of claim 1, wherein generating the semantic vector representations of the anchor item and the semantic vector representations of each of the plurality of advertisement items includes:
generating one or more anchor item vectors and one or more advertisement item vectors; and
extracting the one or more anchor item semantic vectors from the one or more anchor item vectors and extracting the one or more advertisement item semantic vectors from the one or more advertisement item vectors.

5. The system of claim 4, wherein the trained advertisement ranking model is trained using a Siamese-style deep neural network comprising two sub-neural networks.

6. The system of claim 4, wherein the co-viewed item data comprises co-viewed item title data and co-viewed item metadata.

7. A method by a computing device communicatively coupled to at least one server comprising:
during a first time interval, training an advertisement ranking machine-learning model that extracts semantic vector representations using a first dataset including anchor item data of a plurality of anchor items and a second dataset including co-viewed item data, the co-viewed item data comprising (i) historical data of co-view items that were viewed on an e-commerce platform along with one or more of the plurality of anchor items during a common browsing session, and
(ii) for each of the co-view items, a corresponding categorical information into which the item is organized;
during a second time interval, retraining the advertisement ranking machine-learning model using an updated first data set and an updated second dataset;
obtaining, by the computing device, anchor item data of an anchor item currently displayed on a user interface generated by a service application executing on at least a second computing device, the anchor item data of the anchor item comprising anchor item title data and anchor item metadata identifying characteristics of the anchor item and corresponding to categorical information into which the anchor item is organized;
obtaining, by the computing device, advertisement item data comprising advertisement item title data and advertisement item metadata identifying characteristics of a plurality of advertisement items;
generating semantic vector representations of the anchor item and each of the plurality of advertisement items by applying the re-trained advertisement ranking machine-learning model to the anchor item data of the anchor item and the advertisement item data of the plurality of advertisement items, the semantic vector representations of the anchor item including one or more anchor item semantic vectors and being generated from the anchor item data and the semantic vector representations of each of the plurality of advertisement items including one or more advertisement item semantic vectors and being generated from the advertisement item data;
determining, by the computing device, a match score for each advertisement item of the plurality of advertisement items based at least on the semantic vector representations of the anchor item and each of the plurality of advertisement items, the match score identifies a relevance of the advertisement item to the anchor item;
selecting, by the computing device, one or more advertisement items based on the match score of each of the plurality of advertisement items; and
presenting, by the computing device via the at least one server and on the user interface generated by the service application executing on at least the second computing device, the selected one or more advertisement items along with the displayed anchor item.

8. The method of claim 7, wherein the anchor item title data corresponds to a product name of the anchor item displayed on a website or application and the anchor item metadata.

9. The method of claim 7, wherein the match score is determined by comparing the anchor item data to the advertisement item data using cosine similarity.

10. The method of claim 7, generating the semantic vector representations of the anchor item and the semantic vector representations of each of the plurality of advertisement items includes:
generating one or more anchor item vectors and one or more advertisement item vectors; and
extracting the one or more anchor item semantic vectors from the one or more anchor item vectors and extracting the one or more advertisement item semantic vectors from the one or more advertisement item vectors.

11. The method of claim 10, wherein the trained advertisement ranking model is trained using a Siamese-style deep neural network comprising two sub-neural networks.

12. The method of claim 10, wherein the co-viewed item data comprises co-viewed item title data and co-viewed item metadata.

13. A non-transitory computer readable medium having instructions stored thereon, wherein the instructions, when executed by at least one processor, cause a device to perform operations comprising:
during a first time interval, training an advertisement ranking machine-learning model that extracts semantic vector representations using a first dataset including anchor item data of a plurality of anchor items and a second dataset including co-viewed item data, the co-viewed item data comprising (i) historical data of co-view items that were viewed on an e-commerce platform along with one or more of the plurality of anchor items during a common browsing session, and (ii) for each of the co-view items, a corresponding categorical information into which the item is organized;
during a second time interval, retraining the advertisement ranking machine-learning model using an updated first data set and an updated second dataset;
obtaining anchor item data of an anchor item currently displayed on a user interface generated by a service application executing on at least a second computing device, the anchor item data of the anchor item comprising anchor item title data and anchor item metadata identifying characteristics of the anchor item and corresponding to categorical information into which the anchor item is organized;
obtaining advertisement item data comprising advertisement item title data and advertisement item metadata identifying characteristics of a plurality of advertisement items;
generating semantic vector representations of the anchor item and each of the plurality of advertisement items by applying the re-trained advertisement ranking machine-learning model to the anchor item data of the anchor item and the advertisement item data of the plurality of advertisement items, the semantic vector representations of the anchor item including one or more anchor item semantic vectors and being generated from the anchor item data and the semantic vector representations of each of the plurality of advertisement items including one or more advertisement item semantic vectors and being generated from the advertisement item data;
determining a match score for each advertisement item of the plurality of advertisement items based at least on the semantic vector representations of the anchor item and each of the plurality of advertisement items, the match score identifies a relevance of the advertisement item to the anchor item;
selecting one or more advertisement items based on the match score of each of the plurality of advertisement items; and
presenting, via a server communicatively coupled to the at least one processor and on the user interface generated by the service application executing on at least the second computing device, the selected one or more advertisement items along with the displayed anchor item.

14. The non-transitory computer readable medium of claim 13, wherein the anchor item title data corresponds to a product name of the anchor item displayed on a website or application and the anchor item metadata comprises leaf category data.

15. The non-transitory computer readable medium of claim 13, wherein the match score is determined by comparing the anchor item data to the advertisement item data using cosine similarity.

16. The non-transitory computer readable medium of claim 13, wherein generating the semantic vector representations of the anchor item and the semantic vector representations of each of the plurality of advertisement items includes:
generating one or more anchor item vectors and one or more advertisement item vectors; and
extracting the one or more anchor item semantic vectors from the one or more anchor item vectors and extracting the one or more advertisement item semantic vectors from the one or more advertisement item vectors.

17. The non-transitory computer readable medium of claim 16, wherein the trained advertisement ranking model is trained using a Siamese-style deep neural network comprising two sub-neural networks and the co-viewed item data comprises co-viewed item title data and co-viewed item metadata.

* * * * *